(12) United States Patent
Shimizu et al.

(10) Patent No.: US 6,700,841 B1
(45) Date of Patent: Mar. 2, 2004

(54) OPTICAL-DISC RECORDING AND REPRODUCING APPARATUS

(75) Inventors: Masanobu Shimizu, Hirakata (JP); Kazuhiro Teshirogi, Neyagawa (JP); Katsutoshi Sumida, Katano (JP)

(73) Assignee: Matsushita Electric Industrial Co., Ltd. (JP)

( * ) Notice: Subject to any disclaimer, the term of this patent is extended or adjusted under 35 U.S.C. 154(b) by 592 days.

(21) Appl. No.: 09/583,766

(22) Filed: May 31, 2000

(30) Foreign Application Priority Data

May 31, 1999 (JP) .......................................... 11-150789

(51) Int. Cl.[7] .............................................. G11B 7/00
(52) U.S. Cl. ................................................ 369/44.29
(58) Field of Search ........................ 369/44.29, 53.28, 369/44.35, 44.36, 44.41, 44.42

(56) References Cited

U.S. PATENT DOCUMENTS

| | | | |
|---|---|---|---|
| 5,343,454 A | * 8/1994 | Watanabe et al. | 369/44.32 |
| 5,406,545 A | * 4/1995 | Kadowaki | 369/275.3 |
| 5,999,502 A | * 12/1999 | Nakata et al. | 369/44.26 |
| 6,275,463 B1 | * 8/2001 | Nagata et al. | 369/118 |

* cited by examiner

*Primary Examiner*—William Korzuch
*Assistant Examiner*—Kimlien Le
(74) *Attorney, Agent, or Firm*—Parkhurst & Wendel, L.L.P.

(57) ABSTRACT

An optical disc recording and reproducing apparatus realizes stable tracking control for correcting the displacement of an objective lens caused by gravity depending on the positional attitude of the apparatus. The optical disc recording and reproducing apparatus comprises an optical pickup having an objective lens for irradiating an optical disc with light beams, a light receiving section for receiving an optical spot from the optical disc, and a tracking actuator for moving the objective lens in a radial direction of the optical disc, the apparatus performing a tracking operation by driving the tracking actuator based on a tracking error signal obtained from an output signal from the light receiving section, wherein said optical disc recording and reproducing apparatus further comprises an optical-spot offset controlling unit adapted, before the tracking operation, for detecting relative displacement of the optical spot on the light receiving section by operating calculation of the output signal from the light receiving section, and driving and positioning the tracking actuator, thereby maintaining the relative displacement at a fixed value.

1 Claim, 8 Drawing Sheets

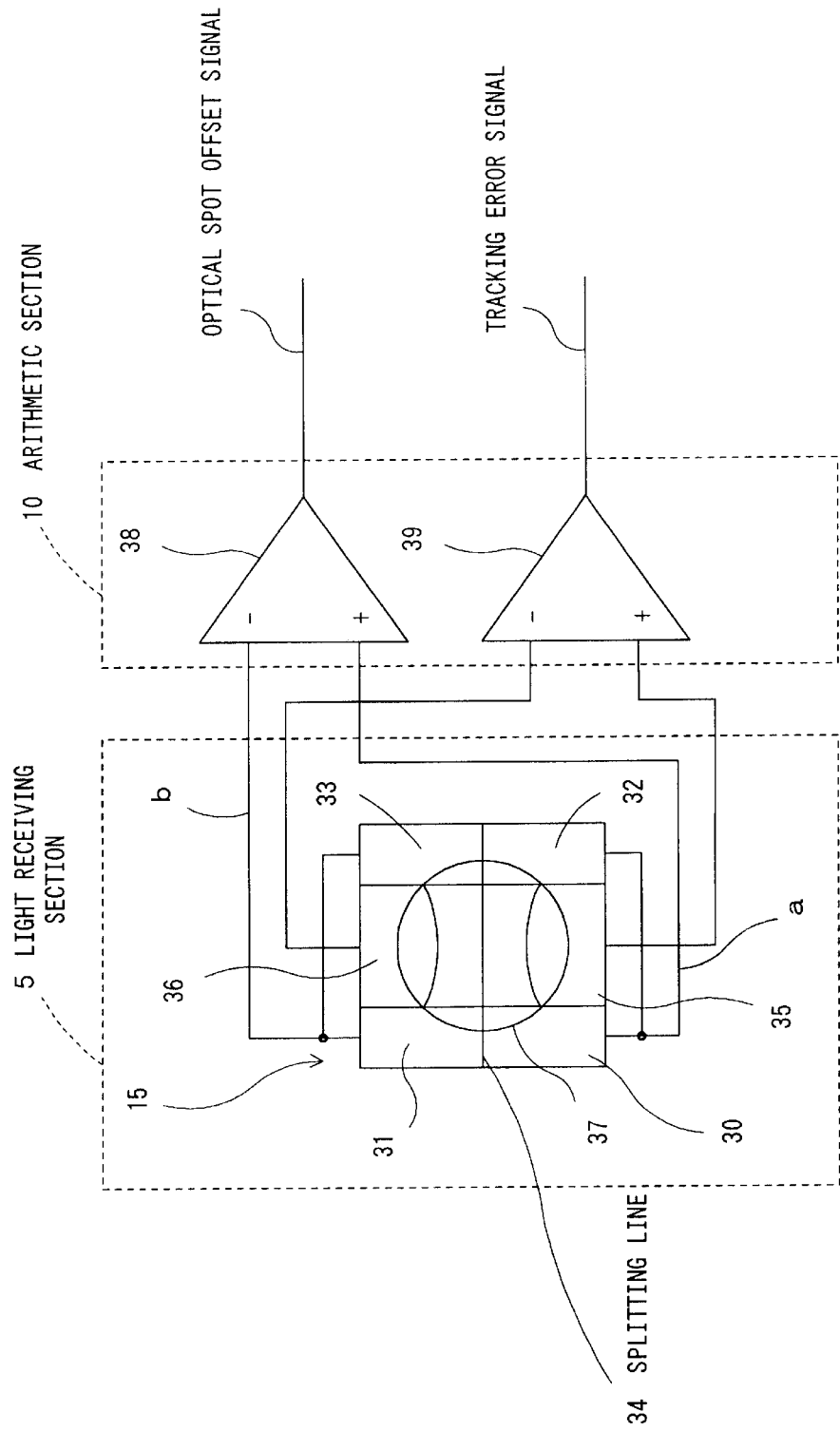

OPTICAL-DISC RECORDING AND REPRODUCING APPARATUS

FIELD OF THE INVENTION

The present invention relates to an optical-disc recording and reproducing apparatus acting as an optical information reproducing and recording apparatus which is applicable to a mini disc (MD) player, a recorder, a CD player, or the like which reproduces information from an optical disc or records information thereon for reproduction.

BACKGROUND OF THE INVENTION

Tracking control in a conventional optical-disc recording and reproducing apparatus will be described with reference to FIG. 8. As shown in this figure, this optical-disc recording and reproducing apparatus is comprised of an optical disc 1 capable of at least either recording or reproduction; a spindle motor 2 for rotating the optical disc 1; an optical pickup 6 for recording/reproducing signals on or from the optical disc, the optical pickup having an objective lens 3 for irradiating the optical disc 1 with light, a tracking actuator 4 for supplying a current to a tracking actuator coil to move the objective lens 3, and a light receiving section 5 for receiving an optical spot from the optical disc 1; an optical head 7 for holding the optical pickup 6; a traverse mechanism 8 for moving the optical head 7 in a radial direction A of the optical disc 1; a traverse mechanism-controlling section 9 for controlling the traverse mechanism 8; an arithmetic section 10 for calculating a signal received by the light receiving section 5 of the optical pickup 6; a tracking error signal-generating section 11 for generating a tracking error signal based on an output signal from the arithmetic section 10; a tracking controlling section 12 for determining a gain, a frequency characteristic, and a phase characteristic required for continuous tracking on the optical disc 1 based on the signal generated by the tracking error signal-generating section 11; a tracking driving section 13 for driving the tracking actuator 4; and a controller 14 for controlling the traverse mechanism-controlling section 9 and the tracking controlling section 12.

The tracking driving section 13 drives the tracking actuator 4 to move the objective lens 3 in a radial direction B of the optical disc 1 within an internal movement range of the optical head 7 in a fashion following tracks of the optical disc 1.

The traverse mechanism-controlling section 9 controls the traverse mechanism 8 to move the entire optical head 7 in the radial direction A of the optical disc 1.

As shown in FIG. 9, the light receiving section 5 is comprised of abeam splitter (not shown) for splitting (a split line 34) the optical spot from the optical disc 1 in a direction generally in parallel with the tracks of the optical disc 1 and outputting the obtained beams, and a photodetector 15 having a plurality of light receiving elements 30 to 36 for receiving the split light. The arithmetic section 10 is comprised of an amplifier 38 for generating an optical-spot offset signal and an amplifier 39 for generating the tracking error signal. FIG. 9 represents the photodetector 15 of the optical pickup 6 and an optical spot 37 on the photodetector 15 in a pseudo manner.

A tracking control operation performed by this optical-disc recording and reproducing apparatus will be described below. While being rotated by the spindle motor 2, the optical disc 1 is irradiated with laser light for reproduction/recording which is controlled to focus on the optical disc 1.

The tracking error signal generating section 11 generates the tracking error signal based on a signal received by the photodetector 15 of the light receiving section 5 of the optical pickup 6. Based on the tracking error signal, a signal having a gain, a frequency characteristic, and a phase characteristic required for continuous tracking on the optical disc 1 is supplied to the tracking actuator 4 of the optical pickup 6 through the tracking controlling section 12 and the tracking driving section 13 to perform the tracking operation.

In a tracking controlling method used by such an optical-disc recording and reproducing apparatus, if this apparatus assumes a position in which the optical disc 1 lies horizontally, the tracking driving section 13 provides no output before starting tracking control and is thus located in such a manner as to balance itself with the gravity G (generally at the center of the movement range of the tracking actuator 4). Since an electric offset or the like is provided in this position, in the above tracking conditions, the tracking operation is performed around the position in which the tracking driving section 13 balances itself with the gravity G.

In addition, if this apparatus assumes a position in which the optical disc 1 stands vertically, the tracking drive section 13 provides no output before starting tracking control and is thus located in such a manner as to balance itself with the gravity G (at a position outward or inward offset from the movement range of the tracking actuator 4). Accordingly, the movement range of the tracking actuator 4 may shift outward or inward significantly depending on the weight of the objective lens 3 or the characteristics of a member supporting the objective lens 3. Then, the tracking operation is performed for reproduction or recording around a position in which the objective lens 3 is substantially displaced. Consequently, in the worst case, signals cannot be read or information cannot be recorded accurately.

Such tracking control carried out by conventional optical-disc recording and reproducing apparatuses is disadvantageous in that the displacement of the objective lens caused by the gravity depending on the position of this apparatus cannot be corrected, thereby degrading reproduced signals.

It is an object of the present invention to provide an optical-disc recording and reproducing apparatus that realizes stable tracking control capable of correcting the displacement of the objective lens caused by the gravity depending on the position of the apparatus.

SUMMARY OF THE INVENTION

An optical-disc recording and reproducing apparatus according to the present invention comprises optical-spot offset-controlling means operating before a tracking operation to calculate an output signal from the light receiving section to detect relative displacement of an optical spot on a light receiving section in order to drive and position a tracking actuator in a manner such that the relative displacement is maintained at a fixed value.

According to the present invention, in every position of the present apparatus, displacement of the objective lens caused by the gravity depending on the position of the present apparatus can be controlled to place the object lens at a position substantially corresponding to a horizontal position of the present apparatus, thereby minimizing variations in the tracking actuator originating from the displacement of the objective lens caused by the gravity depending on the position of the present apparatus. Consequently, a movement range of the tracking actuator can be set within a range in which the tracking actuator can be stably controlled.

A first aspect of the present invention is an optical-disc recording and reproducing apparatus comprising an optical pickup having an objective lens for irradiating an optical disc with light beams, a light receiving section for receiving an optical spot from the optical disc, and a tracking actuator for moving the objective lens in a radial direction of the optical disc, the apparatus performing a tracking operation by driving the tracking actuator based on a tracking error signal obtained from an output signal from the light receiving section, wherein the optical disc recording and reproducing apparatus further comprises optical-spot offset-controlling means adapted, before the tracking operation, for calculating the output signal from the light receiving section to detect relative displacement of the optical spot on the light receiving section in order to drive and position the tracking actuator, thereby maintaining the relative displacement at a fixed value. With this configuration, in every position of the object lens, displacement of the objective lens caused by the gravity depending on the position of the present apparatus can be controlled to place the object lens at a position substantially corresponding to a horizontal position of the present apparatus, thereby minimizing variations in the tracking actuator originating from the displacement of the objective lens caused by the gravity depending on the position of the present apparatus. Consequently, a movement range of the tracking actuator can be set within a range in which the tracking actuator can be stably controlled. Thus, possible degradation of the tracking error signal induced by the displacement of the object lens can be minimized to stabilize the error signal level and balance during the tracking operation. As a result, stable tracking control can advantageously be provided.

A second aspect of the present invention is an optical-disc recording and reproducing apparatus comprising an optical pickup having an objective lens for irradiating an optical disc with light beams, a light receiving section having a plurality of light receiving elements for splitting an optical spot from the optical disc into pieces before receiving them, tracking error signal-generating means for generating a tracking error signal from output signals from the plurality of light receiving elements, a tracking driving section for driving a tracking actuator that displaces the objective lens in a radial direction of the optical disc, tracking controlling means for performing a tracking operation by driving the tracking actuator based on the tracking error signal, and optical-spot offset-controlling means adapted, before the tracking operation, for operating calculation of the output signals from the plurality of light receiving elements in order to detect relative displacement of the optical spot on the light receiving section, and driving and positioning the tracking actuator, thereby maintaining the relative displacement at a fixed value. This aspect provides effects similar to those of the first aspect of the present invention.

In addition, in the optical-disc recording and reproducing apparatus, the optical-spot offset controlling means comprises a positional signal-generating section for calculating the output signals from the plurality of light receiving elements to detect the relative displacement of the optical spot on the light receiving section, a variable-gain amplifier for varying a gain for an optical-spot offset signal from the positional signal-generating section or a fixed gain amplifier having a fixed gain for the optical-spot offset signal, and a positional signal-controlling section for varying a gain with which the tracking actuator is driven. A configuration can thus implemented by operating, before the tracking operation, calculation of an output signal from the light receiving section in order to detect relative displacement of the optical spot on the light receiving section, and driving and positioning the tracking actuator in a manner such that the relative displacement is maintained at a fixed value.

Further, in the optical-disc recording and reproducing apparatus according to the present invention, the tracking controlling means is configured to take over a low-range item of a drive value for the tracking actuator after positioning control and then perform the tracking operation by driving the tracking actuator based on the tracking error signal. In every position of the present apparatus, the displacement of the objective lens caused by the gravity depending on the position of the present apparatus can be controlled so as to place the object lens at a position substantially corresponding to a horizontal position, thereby minimizing degradation of the tracking error signal originating from the displacement of the objective lens caused by the gravity depending on the position of the present apparatus. Consequently, the error signal level and the balance during the tracking operations are stabilized so that a system capable of stable tracking control can be obtained.

BRIEF DESCRIPTION OF THE DRAWINGS

FIG. 9 is a block diagram showing the configuration of a conventional light receiving section and an arithmetic section.

An optical-disc recording and reproducing apparatus according to the present invention will be described below based on specific embodiments.

Embodiment 1

Figure 1:
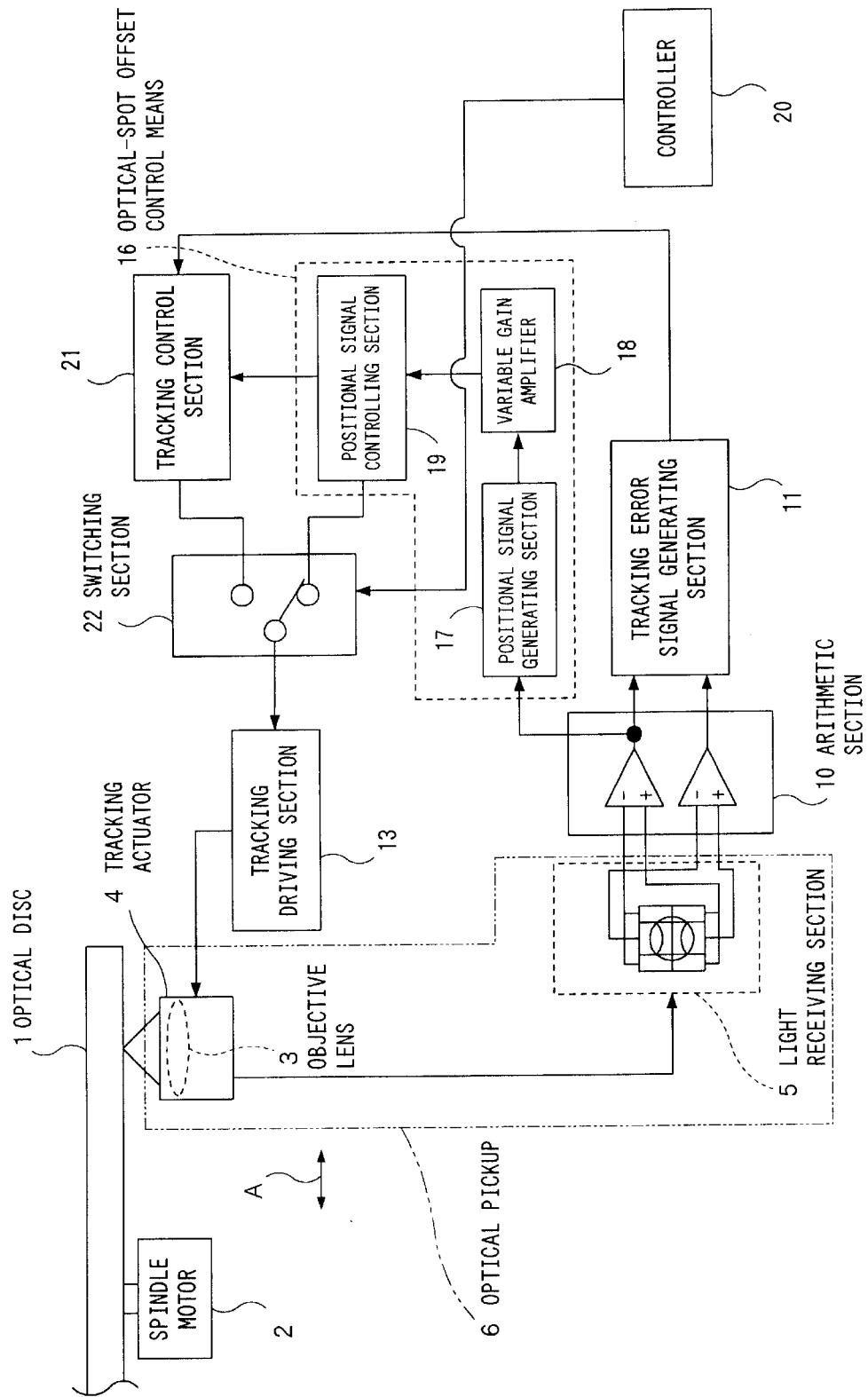
FIG. 1 is a block diagram showing the configuration of an optical-disc recording and reproducing apparatus according to Embodiment 1 of the present invention.

An optical-disc recording and reproducing apparatus according to Embodiment 1 of the present invention shown in FIG. 1 comprises an optical pickup 6 having an objective lens 3 for irradiating an optical disc with light beams, a light receiving section 5 for receiving an optical spot from the optical disc 1, and a tracking actuator 4 for moving the objective lens 3 in a radial direction of the optical disc 1, wherein a tracking operation is performed by driving the tracking actuator 4 based on a tracking error signal obtained from an output signal from the light receiving section 5, as in the above described conventional example. Optical-spot offset-controlling means 16 is provided which operates before the tracking operation to calculate the output signal from the light receiving section 5 to detect relative displacement of the optical spot on the light receiving section 5 in order to drive and position the tracking actuator 4 so that the relative displacement is maintained at a fixed value. This is a point in which this embodiment differs from the above described conventional example.

In FIG. 1, illustration of an optical head 7 and a traverse mechanism 8, which have been described in the conventional example, is omitted.

As shown in FIG. 1, the optical-spot offset-controlling means 16 is comprised of a positional signal-generating section 17 for using output signals from a plurality of light receiving elements to calculate an optical spot from the optical disc 1 in order to generate an optical-spot offset signal that detects the relative displacement of the optical spot, a variable-gain amplifier 18 for varying a gain for the optical-spot offset signal from the positional signal-generating section 17, and a positional signal-controlling section 19 for calculating the optical-spot offset signal generated by the positional signal-generating section 17 and having its gain varied by the variable-gain amplifier 18, in a manner such that the relative displacement of the optical spot is maintained at a fixed value, thereby generating a signal having a gain, a frequency characteristic, and a phase characteristic for supply to the tracking drive section 13. A controller 20 controls the optical-spot offset-controlling means 16, a tacking controlling section 21, and a switching section 22.

The configuration of the light receiving section 5 and arithmetic section 10 will be described in further detail with reference to FIGS. 2A to 2C.

Figure 2A:
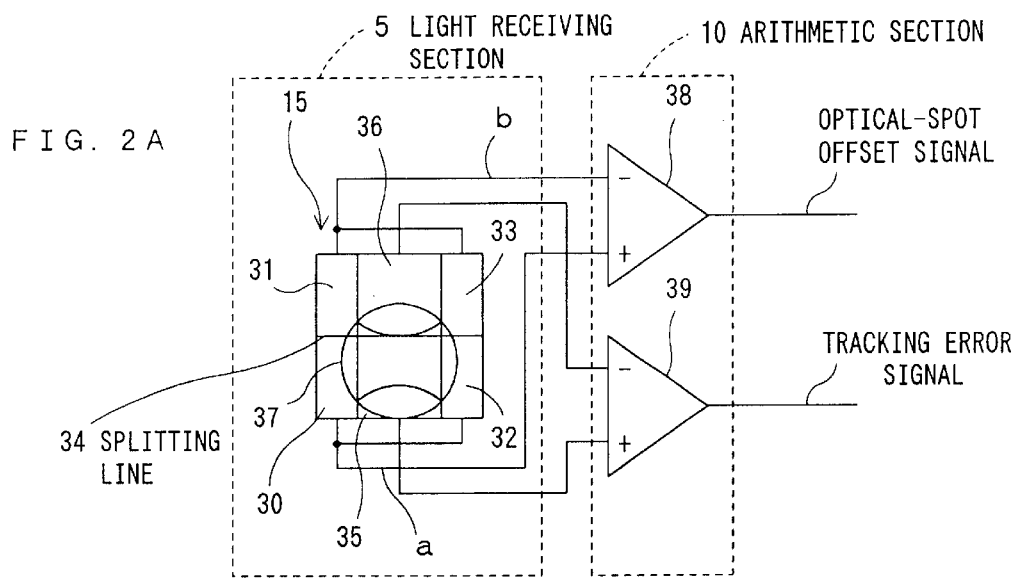
FIGS. 2A to 2C are diagrams useful in describing an offset of an optical spot on a light receiving section which is caused by displacement of an objective lens.
Figure 2B:
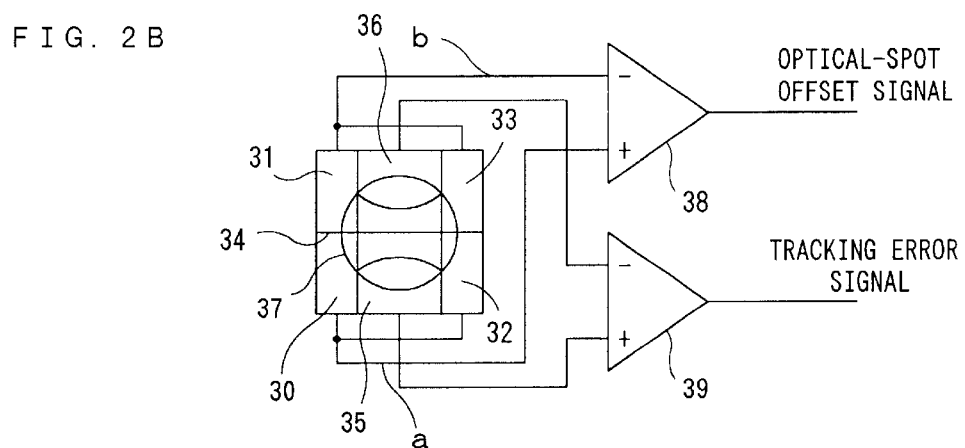
Figure 2C:
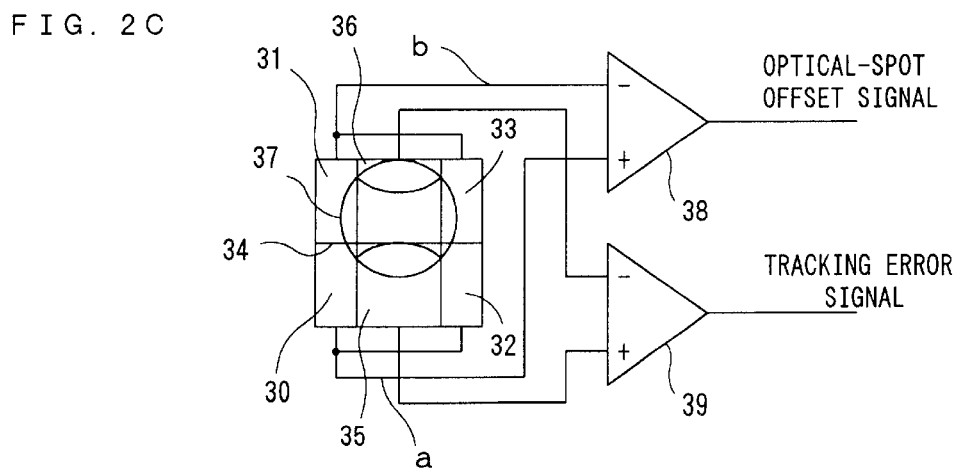

As shown in FIGS. 2A to 2C, the light receiving section 5 is comprised of a beam splitter (not shown) for splitting an optical spot 37 from the optical disc 1 in a direction substantially parallel with tracks of the optical disc 1 (splitting line 34) and outputting the obtained beams, and a photodetector 15 having a plurality of light receiving elements 30 to 36 for receiving the beams obtained by the splitting. FIGS. 2A to 2C represent the photodetector 15 of the optical pickup 6 and the optical spot 37 on the photodetector 15 in a pseudo manner, and the splitting line 34 is produced by the above described beam splitter.

A light receiving element 30 is one of a plurality of light receiving elements for receiving the beam obtained by splitting the optical spot in a direction substantially parallel with the tracks of the optical disc 1. The light receiving element 30 receives part of the beam which corresponds to a neighborhood of an exterior of the optical spot 37 opposite to an optical disc-rotating direction and which also corresponds to a radially inner peripheral side of the optical disc. The light receiving element 31 receives part of the beam which corresponds to a neighborhood of the exterior of the optical spot 37 opposite to the optical disc-rotating direction and which also corresponds to a radially outer peripheral side of the optical disc. The light receiving element 32 receives part of the beam which corresponds to a neighborhood of an exterior of the optical spot 37 in the optical disc-rotating direction and which also corresponds to the radially inner peripheral side of the optical disc. The light receiving element 33 receives part of the beam which corresponds to a neighborhood of the exterior of the optical spot 37 in the optical disc-rotating direction and which also corresponds to the radially outer peripheral side of the optical disc. The light receiving element 35 receives part of the beam which corresponds to a neighborhood of the center of the optical spot 37 and to the radially inner peripheral side of the optical disc. The light receiving element 36 receives part of the beam which corresponds to a neighborhood of an exterior of the optical spot 37 and to the radially outer peripheral side of the optical disc.

The arithmetic section 10 is comprised of an amplifier 38 for generating an optical-spot offset signal and an amplifier 39 for generating a tracking error signal.

In addition, FIGS. 2A to 2C shows that with a base of the optical pickup 6 fixed, the position of the optical spot 37 varies as the objective lens 3 (that is, the actuator position) shifts depending on the position of the present apparatus.

Figure 3:
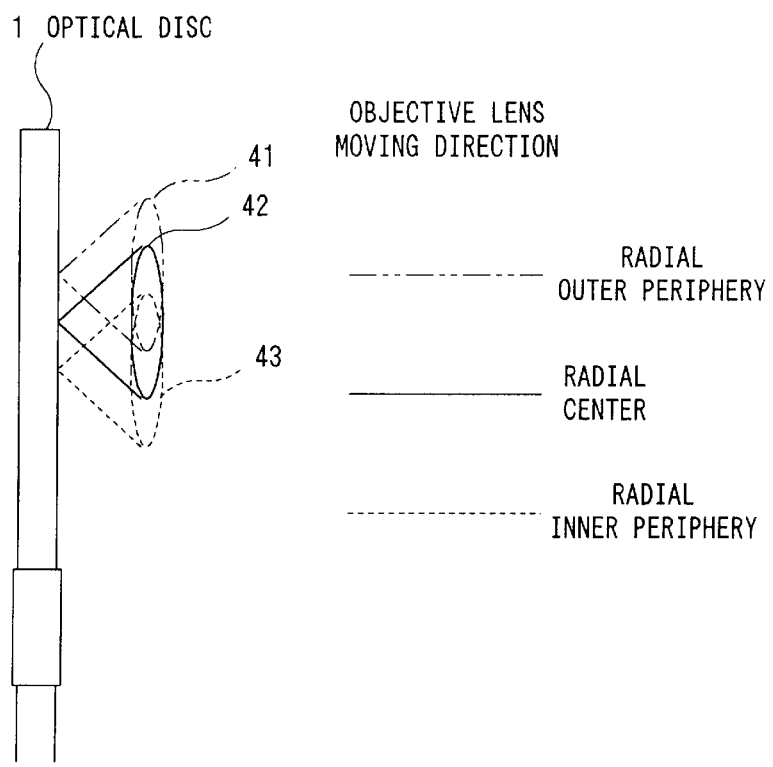
FIG. 3 is a diagram useful in describing the displacement of the objective lens.

FIG. 3 shows that with the base of the optical pickup 6 fixed, the objective lens 3 is displaced depending on the position of the present apparatus. The alternate long and two short dashes line in FIG. 3 shows that the objective lens 3 is located on the radially outer periphery of the optical disc 1. The solid line 42 in FIG. 3 shows that the objective lens 3 is located at the radial center of the optical disc 1. The broken line 43 in FIG. 3 shows that the objective lens 3 is located on the radially inner periphery of the optical disc 1.

Figure 4:
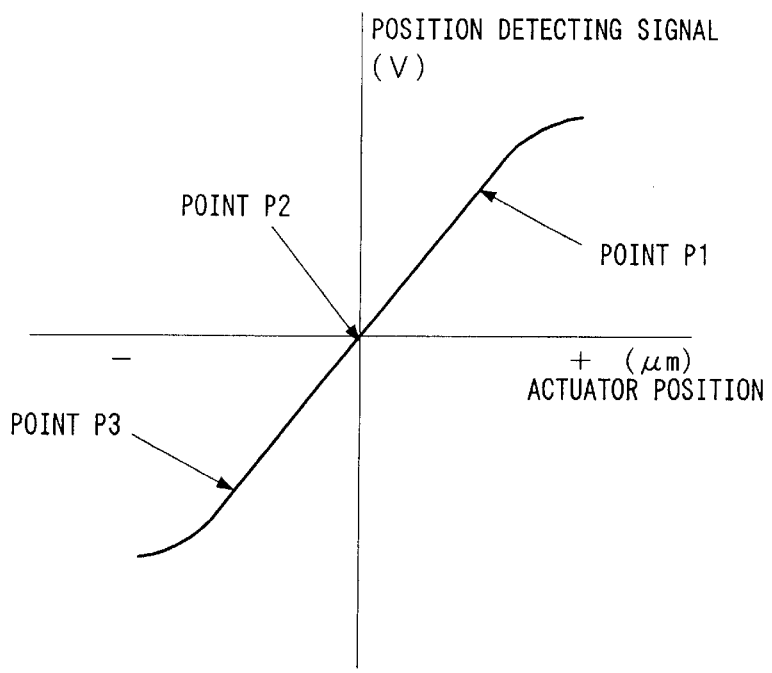
FIG. 4 is a diagram showing a variation in a position detecting signal corresponding to the displacement of the objective lens according to Embodiment 1.

FIG. 4 is a diagram showing a variation in position detecting signal (the optical-spot offset signal) arising from an offset of the objective lens (the actuator position) 3.

The operation of the optical-disc recording and reproducing apparatus will be explained below.

A spindle motor 2 rotates the optical disc 1 to set at a certain linear velocity the optical spot 37 from the optical disc 1, which records and reproduces focus-controlled laser light for reproduction/recording condensed on the optical disc. During this rotation, the optical disc 1 is irradiated with the focus-controlled laser light.

The beam splitter splits optical spot 37 from the optical disc 1 in a direction substantially parallel with tracks of the optical disc 1, and the beam obtained by the splitting is condensed on the photodetector 15 so as to be received by the light receiving elements 30 to 36.

The displacement of the condensed optical spot 37 depending on the position of the present apparatus as shown in FIGS. 2A to 2C will be described below.

When a surface of the optical disc 1 of the present apparatus assumes a perpendicular position and the optical pickup 6 is located above a rotating center of the optical disc 1, the objective lens 3 is displaced in a radially outer peripheral direction of the optical disc 1 due to the gravity corresponding to this position. Consequently, the optical spot 37 shifts in the radially inner peripheral direction of the optical disc 1 as shown in FIG. 2A, and assumes the position shown by the broken line 43 in FIG. 3.

If the surface of the optical disc 1 of the present apparatus assumes a horizontal position and the objective lens 3 is not displaced in the radial direction of the optical disc 1 despite the gravity corresponding to this position, then the optical spot 37 does not shift in the radial direction of the optical disc 1 as shown in FIG. 2B, and assumes the position shown by the solid line 42 in FIG. 3.

When the surface of the optical disc 1 of the present apparatus assumes a perpendicular position opposite to that in FIG. 2A, the objective lens 3 is displaced in the radially outer peripheral direction of the optical disc 1 due to the gravity corresponding to this position. Consequently, the optical spot 37 shifts in the radially outer peripheral direction of the optical disc 1 as shown in FIG. 2C, and assumes the position shown by the alternate long and two short dashes line 41 in FIG. 3.

An optical-spot offset signal-generating amplifier 38 generates the optical-spot offset signal by subtracting an addition signal b obtained by adding signals from the light receiving element 31 and the light receiving element 33 together, from an addition signal a obtained by adding signals from the light receiving element 30 and the light receiving element 32 together.

If, for example, the present apparatus assumes such a position as shown in FIG. 2B, the optical spot 37 has the splitting line 34 located in its center, the splitting line 34 splitting the optical spot 37 in a direction substantially parallel with the tracks of the optical disc 1. Thus, the addition signals a and b both indicate an identical value, so that subtraction of the addition signal b from the addition signal a results in "0." This corresponds to a point P2, shown in FIG. 4.

Additionally, if the present apparatus assumes such a position as shown in FIG. 2A, the light receiving elements 30, 32, which are located under the splitting line 34, receive a larger quantity of light from the optical spot 37. Accordingly, the addition signal a is larger than the addition signal b, whereby subtraction of the addition signal b from the addition signal a results in a positive voltage value. This corresponds to a point P1, shown in FIG. 4.

In addition, if the present apparatus assumes such a position as shown in FIG. 2C, the light receiving elements 31, 33, which are located over the splitting line 34, receive a larger quantity of light from the optical spot 37. Accordingly, the addition signal b is larger than the addition signal a, whereby subtraction of the addition signal b from the addition signal a results in a negative voltage value. This corresponds to a point P3, shown in FIG. 4.

The optical-spot offset signal generated in this manner has a significantly varying voltage value due to variations in the sensitivity of the light receiving elements, variations in the quantity of light in laser light, variations in the refractive index of the optical disc, offsets in addition amplifiers, gain variations, etc. Thus, the variable-gain amplifier 18 is used to set the optical-spot offset signal voltage at a fixed value when the objective lens 3 has moved a certain amount so that the fixed voltage value is output to the positional signal-controlling section 19. This signal exhibits such a characteristic as shown in FIG. 4. depending on the position of the objective lens 3.

In order to maintain the relative displacement of the optical spot at a fixed value (for example, zero the optical-spot offset signal), the positional signal-controlling section 19 calculates the optical-spot offset signal to generate a signal having a gain, a frequency characteristic, an a phase characteristic, and supplies the generated signal to the tracking driving section 13 to control the tracking actuator 4 so that the objective lens 3 is located at a fixed position before the tracking operation.

With this configuration, in every position of the present apparatus, the displacement of the objective lens 3 caused by the gravity depending on the position of the present apparatus can be controlled to place the object lens 3 at a position substantially corresponding to a horizontal position of the present apparatus, thereby enabling the objective lens 3 to be positioned substantially at the center of a movement range thereof. Accordingly, possible degradation of the tracking error signal induced by the displacement of the objective lens 3 caused by the gravity depending on the position of the present apparatus can be minimized to stabilize the error signal level and balance during the tracking operation, resulting in stable tracking control.

Additionally, by increasing a gain in a self resonance frequency in a tracking direction which is processed by the optical pickup 6, vibration occurring at the self resonance frequency can be restrained to enable stable tracking control.

In addition, by applying a certain band limitation to the optical-spot offset signal, mixture of the tracking error signal with the optical-spot offset signal can be lessened to enable further stable tracking control.

Embodiment 2

Figure 5:
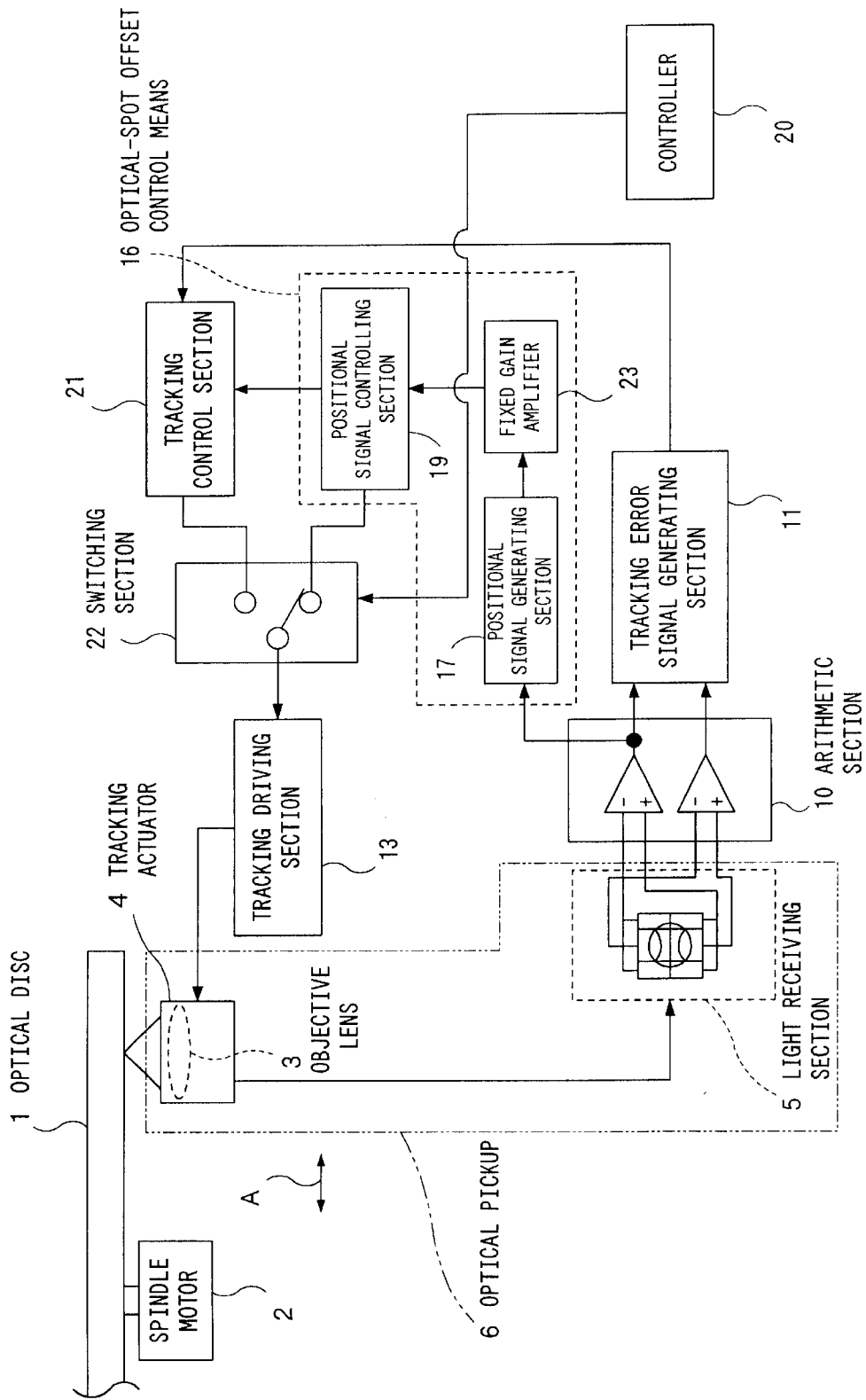
FIG. 5 is a block diagram showing the configuration of an optical-disc recording and reproducing apparatus according to Embodiment 2 of the present invention.

An optical-disc recording and reproducing apparatus according to Embodiment 2 differs from the above described Embodiment 1 in that a fixed gain amplifier 23 having a fixed gain for the optical-spot offset signal replaces the variable-gain amplifier 18 in the above described Embodiment 1, as shown in FIG. 5.

In the above described Embodiment 1, since the optical-spot offset signal has a significantly varying voltage value due to variations in the sensitivity of the light receiving elements, variations in the quantity of light in laser light, variations in the refractive index of the optical disc, offsets in addition amplifiers, gain variations, etc., the variable-gain amplifier 18 is used to set the voltage at the fixed value. If, however, the variation of the optical-spot offset signal is within a tolerance, then the variable-gain amplifier 18 is replaced by the fixed gain amplifier 23, and an optical-spot offset signal voltage value obtained when the objective lens 3 has moved a certain amount is stored. Then, the difference between this voltage value and a target voltage is converted into a gain, and a required gain is multiplied by the difference gain to generate in the positional-signal controlling section 19 a signal having a required gain and frequency and phase characteristics.

With this configuration, if the variation of the optical-spot offset signal is within the tolerance, the variable-gain amplifier 18 according to the above described Embodiment 1 can be replaced by the fixed gain amplifier 23 in which the gain of the optical spot offset signal is fixed to provide effects similar to those of Embodiment 1.

Embodiment 3

In an optical-disc recording and reproducing apparatus according to Embodiment 3, the tracking controlling section 21 shown in FIGS. 1 and 5 for the corresponding embodiments is configured to add a low-range component of a drive value for the tracking actuator 4 which is obtained after positioning control, to the tracking driving signal as an offset so that the tracking operation is performed by driving the tracking actuator 4 based on the tracking error signal.

Figure 6:
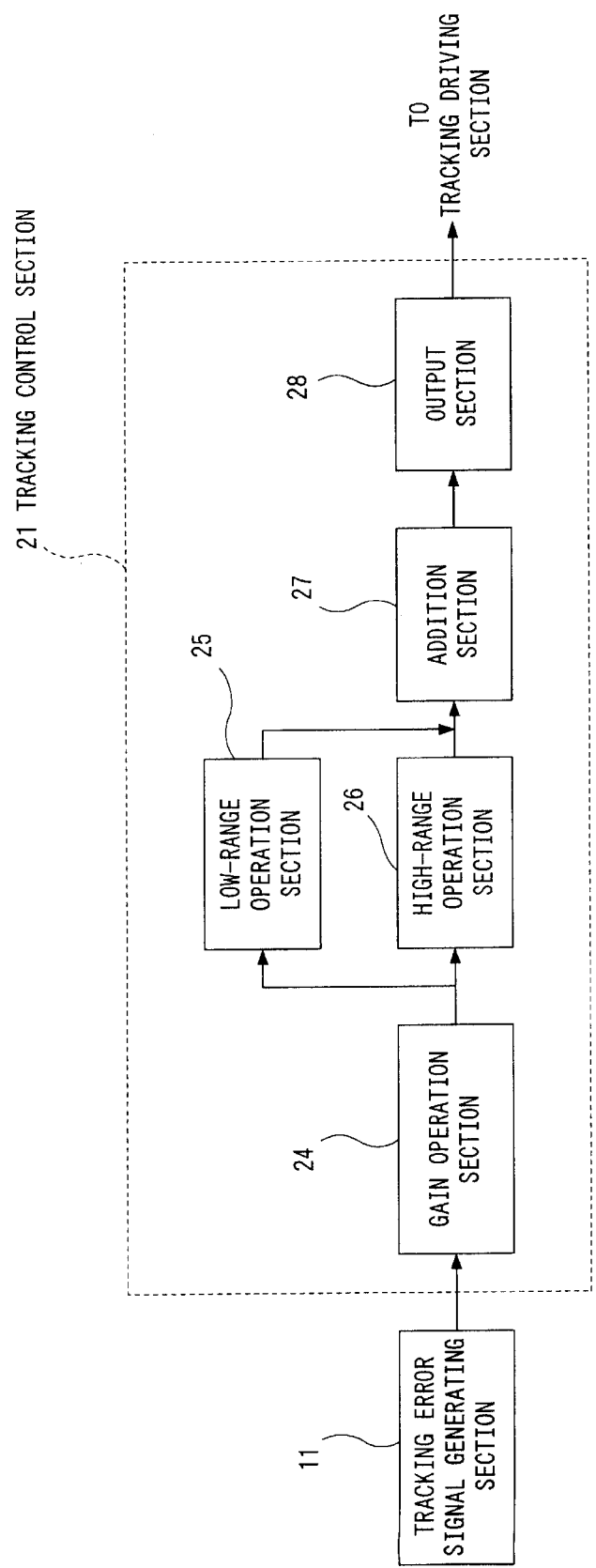
FIG. 6 is a block diagram showing the configuration of a tracking controlling section according to Embodiment 3 of the present invention.

As shown in FIG. 6, the tracking control section 21 is comprised of a gain operation section 24 to which the tracking error signal from the tracking error signal-generating section 11 is input to obtain a loop gain required for tracking control, a low-range operation section 25 and a high-range operation section 26 for obtaining the frequency and phase of an error signal with the gain obtained by the gain operation section 24, an addition section 27 for adding together results calculated by the low-range operation section 25 and high-range operation section 26, and an output section 28 for outputting a result of the addition by the addition section 27 in a manner consistent with limit processing and an output form .

Figure 7:
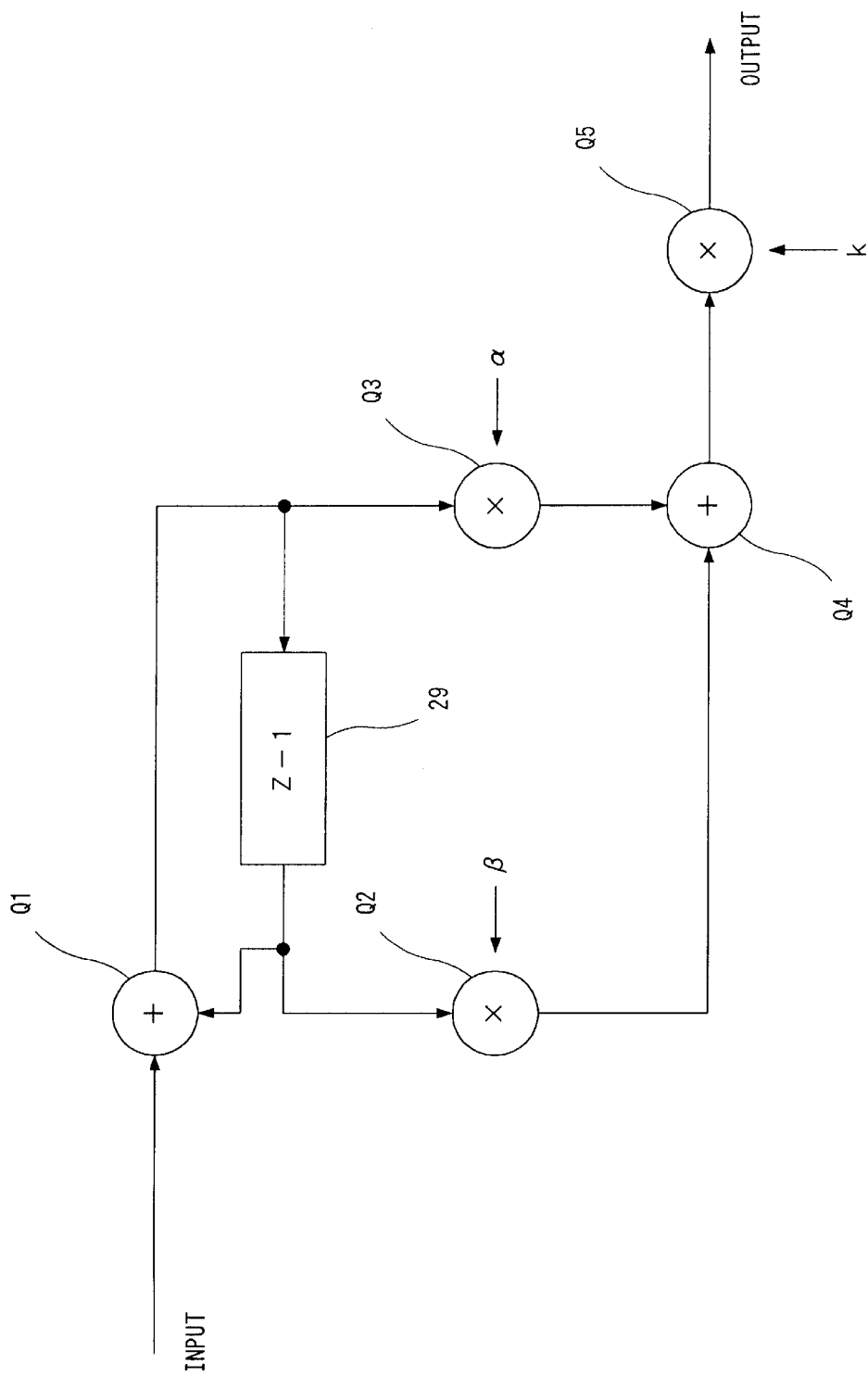
FIG. 7 is a block diagram showing the configuration of a low-range operation section according to Embodiment 3.
Figure 8:
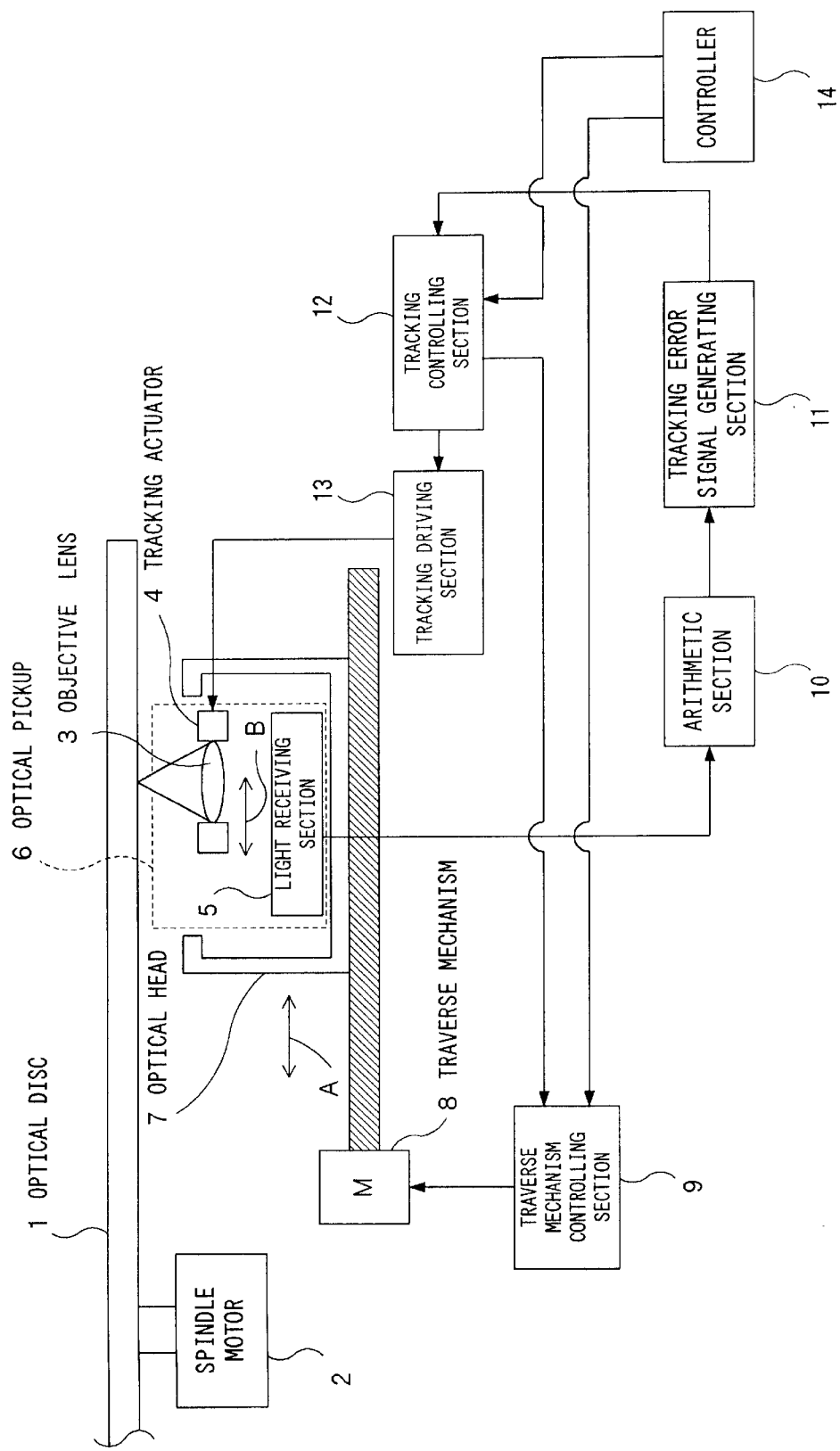
FIG. 8 is a block diagram showing the configuration of a conventional optical disc recording and reproducing apparatus.

FIG. 7 shows an interior of the low-range operation section 25 (an example of a primary filter). An output from the gain operation section 24 is input to an input of the low-range operation section 25, and an output from the low-range operation section 25 is input to the addition section 27. At a point Q1, a signal with a tracking loop gain obtained by an input tracking error signal is added by a "Z–1" process section 29 to a signal stored during the preceding process, and a result of the addition is also stored in the "Z–1" process section 29 and is multiplied by an β constant (an element determining the frequency and phase) at a point Q2. In addition, the input signal is added by the "Z–1"process section 29 to the signal stored during the preceding process, and a result of the addition is then multiplied by an α constant (an element determining the frequency and phase) at a point Q3. Results of the multiplication at the points Q2, Q3 are added together at a point Q4, and a result of the addition is multiplied by k at a point Q5. A result of the multiplication is then output, so that this data is placed in the addition section 27. Performing the above operation at intervals of a number of cycles provides a low-range frequency and phase required for tracking.

As described in each of the above described embodiments, in every position of the optical-disc recording and reproducing apparatus according to Embodiment 3, the displacement of the objective lens 3 caused by the gravity depending on the position of the present apparatus can be controlled to place the objective lens 3 at a position substantially corresponding to the horizontal position of the apparatus, whereby the displacement of the objective lens 3 caused by the gravity depending on the position of the present apparatus can be set at a fixed value before the tracking operation. Then, before the tracking operation, a low-range component of a drive value for the positioned tracking actuator 4, which has been successfully placed in the position substantially corresponding to the horizontal position, is handed over to the tracking controlling section 21 by the positional signal controlling section 19. Subsequently, the switching section 22 is switched to the tracking control section 21 to prevent DC variations therein, followed by the on tracking operation.

Specifically, output signals from the light receiving signals 35 and 36 shown in FIG. 2 are subjected to a subtraction, and a result of multiplication of a low-range component of the optical-spot offset signal is added to a signal substracted by the output signal from the light receiving elements 35 and 36 as an offset correction, so that an offset-corrected signal is output to the tracking control section 21. The tracking error signal generated by the tracking error signal-generating section 11 shown in FIG. 1 is also input to the tracking control section 21.

Based on the tracking error signal based on the offset-corrected signal, the tracking controlling section 21 controls tracking by supplying a signal having a gain and a frequency and phase characteristics required for continuous tracking on the disc 1, to the tracking actuator 4 of the optical pickup 6 through the tracking driving section 13.

In addition, before closing this control loop, the tracking control section 21 subjects to a loop gain conversion, the low-range component with which the positional signal-controlling section 19 has successfully placed the objective lens in the position substantially corresponding to the horizontal position, thereby obtaining a low-range component for a loop filter.

The operation of handing the low-range component over to tracking control will be described below.

The output section 28 is converted into the low-range operation section 25 to allow an output value from the positional signal-controlling section 19 to reach the output section 28 immediately before switching of the switching section 22 shown in FIG. 1 so that at a control voltage provided when the actuator position is controlled to enter a certain range close to the point 2 in FIG. 4, the tracking control section 21 emits an output equal to the output from the positional signal-controlling signal 19 at an instant when the switching section 22 switches to the tracking control section 21. In this case, the tracking control section 21 does not operate immediately before the switching of the switching section 22. Thus, the tracking error signal is "0," and the content of the "Z–1" process section 29 shown in FIG. 7 is "0." Additionally, the output from the positional signal-controlling section 19 is a position correcting signal that principally serves DC voltage correction, so that conversion in the high-range operation section 26 is neglected, while conversion in the low-range operation section 25 is chiefly used.

For this conversion, the output section 28 outputs a result from the addition section 27 in a manner compatible with the limit processing and output form. Thus, with the control voltage provided when the actuator position is controlled to enter the certain range close to the point 2 in FIG. 4, no limit processing is carried out and only a conversion consistent with the output form is executed. Since the conversion in the high-range operation section 26 is neglected, the operation in the addition section 27 consists of the conversion in the low-range operation section 25. The conversion consistent with the output form of the output section 28 corresponds to the output shown in FIG. 7.

Accordingly, an inverse conversion is carried out at the point Q5 wherein the multiplier k is changed to 1/k. In an inverse conversion at the point Q4, since the tracking control section 21 does not operate at the point Q3 as described above, the tracking error signal is "0," the input is also "0," and the result of multiplication of the α constant is also "0." Hence, the conversion at the point Q4 requires only the β constant at the point Q2. An inverse conversion at the point Q2 can be carried out using 1/β. The result of this inverse conversion corresponds to the "Z–1" process section 29, as seen in FIG. 7.

Thus, the substitution of the low-range component means that the above inverse conversions are executed to calculate and substitute the value for the "Z–1", process section 29 so that the same output is obtained from the tracking control section at the instant when the switching section 22 is switched.

With this configuration, before this control loop is closed, the low-range component with which the positional signal-controlling section 19 has successfully placed the objective lens at the position substantially corresponding to the horizontal position, is subjected to the loop gain conversion to obtain the low-range component for the loop filter. As a result, the tracking controlling section 21 is free from DC variations, whereby the error signal level and balance are stabilized to enable stable tracking control.

As described above, the optical-disc recording and reproducing apparatus of the present invention includes the optical-spot offset-controlling means that operates before the tracking operation to calculate the output signal from the light receiving section to detect the relative displacement of the optical spot on the light receiving section in order to drive and position the tracking actuator so that the relative displacement is maintained at a fixed value. Consequently, in every position of the present apparatus, the displacement of the objective lens caused by the gravity depending on the position of the present apparatus can be controlled to place the object lens at the position substantially corresponding to the horizontal position of the present apparatus, thereby minimizing variations in the tracking actuator originating from the displacement of the objective lens caused by the gravity depending on the position of the present apparatus of the apparatus. As a result, the movement range of the tracking actuator can be set within the range in which the tracking actuator can be stably controlled. Thus, possible degradation of the tracking error signal induced by the displacement of the object lens can be minimized to stabilize the error signal level and balance during the tracking operation. Therefore, stable tracking control can advantageously be provided.

The optical-spot offset-controlling means is comprised of the positional signal-generating section for calculating the output signals from the plurality of light receiving elements to detect the relative displacement of the optical spot on the light receiving section, the variable-gain amplifier for varying the gain for the optical-spot offset signal from the positional signal-generating section, and the positional signal-controlling section for varying the gain with which the tracking actuator is driven. A configuration can thus implemented which operates before the tracking operation to calculate the output signal from the light receiving section in order to detect the relative displacement of the optical spot on the light receiving section, thereby driving and positioning the tracking actuator in a manner such that the relative displacement is maintained at a fixed value.

In addition, if the variation of the optical-spot offset signal is within the tolerance, then the variable-gain amplifier is replaced by the fixed gain amplifier having the fixed gain for the optical-spot offset signal. Effects similar to those described above can thereby be provided.

Additionally, the tracking controlling means is configured to take over the low-range item of the drive value for the tracking actuator after positioning control and then perform the tracking operation by driving the tracking actuator based on the tracking error signal. Then, in every position of the present apparatus, the displacement of the objective lens caused by the gravity depending on the position of the present apparatus can be controlled to place the object lens at a position substantially corresponding to the horizontal position of the present apparatus, thereby minimizing degradation of the tracking error signal originating from the displacement of the objective lens caused by the gravity depending on the position of the present apparatus. Consequently, the error signal level and the balance during the tracking operations are stabilized, so that a system capable of stable tracking control can be obtained.

What is claimed is:

1. An optical disc recording and reproducing apparatus, comprising:

a light receiving section having a plurality of light receiving elements for splitting an optical spot reflected from an optical disc into pieces;

tracking error signal generating means for generating a tracking error signal from output signals from said plurality of light receiving elements;

a tracking driving section for driving a tracking actuator that displaces the objective lens in a radial direction of the optical disc;

tracking controlling means for performing a tracking operation by driving said tracking actuator based on said tracking error signal, wherein
the tracking controlling means is configured to take over a low-range item of a drive value for the tracking actuator after performing positioning control and thereafter drive said tracking actuator baaed on the tracking error signal, thereby performing the tracking operation by driving; and optical-spot offset controlling means adapted, before performing the tracking operation, for operating calculation of the output signals from said plurality of light receiving elements to detect displacement of the objective lens from displacement of the optical spot on said light receiving section, and driving and positioning said tracking actuator, thereby maintaining the displacement of the objective lens at a fixed value.

* * * * *